United States Patent
Heiser, II et al.

(10) Patent No.: US 11,250,474 B2
(45) Date of Patent: Feb. 15, 2022

(54) PERSONALIZED CONSUMER ADVERTISING PLACEMENT

(75) Inventors: Russel Robert Heiser, II, Mogadore, OH (US); Nathan W. Shahan, Tallmadge, OH (US); John Cale, Akron, OH (US)

(73) Assignee: Segmint, Inc., Tallmadge, OH (US)

( * ) Notice: Subject to any disclaimer, the term of this patent is extended or adjusted under 35 U.S.C. 154(b) by 2186 days.

(21) Appl. No.: 11/865,466

(22) Filed: Oct. 1, 2007

(65) Prior Publication Data

US 2008/0091535 A1    Apr. 17, 2008

Related U.S. Application Data

(60) Provisional application No. 60/849,156, filed on Oct. 2, 2006.

(51) Int. Cl.
*G06Q 30/02*        (2012.01)
*G06F 16/9535*    (2019.01)

(52) U.S. Cl.
CPC ..... *G06Q 30/0273* (2013.01); *G06F 16/9535* (2019.01); *G06Q 30/02* (2013.01); *G06Q 30/0246* (2013.01); *G06Q 30/0257* (2013.01); *G06Q 30/0264* (2013.01); *G06Q 30/0269* (2013.01); *G06Q 30/0277* (2013.01)

(58) Field of Classification Search
CPC .............. G06Q 30/02; G06Q 30/0273; G06Q 30/0246; G06Q 30/0257; G06Q 30/0264; G06Q 30/0269; G06Q 30/0277; G06F 16/9535
USPC .......................................................... 705/14
See application file for complete search history.

(56) References Cited

U.S. PATENT DOCUMENTS

| | | |
|---|---|---|
| 5,319,542 A | 6/1994 | King, Jr. et al. |
| 5,442,771 A | 8/1995 | Filepp et al. |
| 5,446,891 A | 8/1995 | Kaplan et al. |
| 5,642,485 A | 6/1997 | Deaton et al. |
| 5,644,723 A | 7/1997 | Deaton et al. |
| 5,649,114 A | 7/1997 | Deaton et al. |
| 5,687,322 A | 11/1997 | Deaton et al. |
| 5,796,967 A | 8/1998 | Filepp et al. |
| 5,961,593 A | 10/1999 | Gabber et al. |
| 6,055,510 A | 4/2000 | Henrick et al. |
| 6,073,140 A | 6/2000 | Morgan et al. |

(Continued)

FOREIGN PATENT DOCUMENTS

| | | |
|---|---|---|
| CN | 1737842 A | 2/2006 |
| EP | 0 991 006 A2 | 4/2000 |

OTHER PUBLICATIONS

"HTTP cookie", http://en.wikipedia.org/wiki/HTTP_cookie, 10 pgs., accessed Jul. 29, 2008.

(Continued)

*Primary Examiner* — Thuy N Nguyen
(74) *Attorney, Agent, or Firm* — Calfee, Halter & Griswold, LLP

(57) ABSTRACT

The subject personalized consumer advertising/ad placement system provides the ability for advertisers, ad agencies, and any other applicable organization to determine and electronically present their "ideal" consumer profile and have their advertisement/promotion placed in front of all consumers who match the profile based on the anonymous mining of the consumers actual spending across a broad base of spending categories.

26 Claims, 9 Drawing Sheets

(56) References Cited

U.S. PATENT DOCUMENTS

| | | | |
|---|---|---|---|
| 6,128,663 A | 10/2000 | Thomas | |
| 6,216,129 B1 | 4/2001 | Eldering | |
| 6,236,975 B1 | 5/2001 | Boe et al. | |
| 6,266,649 B1 | 7/2001 | Linden et al. | |
| 6,317,722 B1 | 11/2001 | Jacobi et al. | |
| 6,330,543 B1 | 12/2001 | Kepecs | |
| 6,401,075 B1* | 6/2002 | Mason | G06Q 30/02 705/14.72 |
| 6,424,949 B1 | 7/2002 | Deaton et al. | |
| 6,519,571 B1 | 2/2003 | Guheen et al. | |
| 6,523,041 B1 | 2/2003 | Morgan et al. | |
| 6,560,578 B2 | 5/2003 | Eldering | |
| 6,684,195 B1 | 1/2004 | Deaton et al. | |
| 6,766,327 B2 | 7/2004 | Morgan, Jr. et al. | |
| 7,062,510 B1 | 6/2006 | Eldering | |
| 7,072,849 B1 | 7/2006 | Filepp et al. | |
| 7,213,032 B2 | 5/2007 | Mascarenha | |
| 7,930,252 B2* | 4/2011 | Bender et al. | 705/74 |
| 2001/0034651 A1* | 10/2001 | Marks et al. | 705/14 |
| 2001/0049620 A1* | 12/2001 | Blasko | 705/10 |
| 2002/0003162 A1* | 1/2002 | Ferber et al. | 235/14 |
| 2002/0019764 A1* | 2/2002 | Mascarenhas | 705/10 |
| 2002/0026345 A1* | 2/2002 | Juels | 705/10 |
| 2002/0046341 A1* | 4/2002 | Kazaks et al. | 713/182 |
| 2002/0072975 A1* | 6/2002 | Steele et al. | 705/14 |
| 2002/0099605 A1* | 7/2002 | Weitzman et al. | 705/14 |
| 2002/0099824 A1* | 7/2002 | Bender et al. | 709/225 |
| 2002/0111863 A1 | 8/2002 | Landesmann | |
| 2002/0188507 A1* | 12/2002 | Busche | 705/14 |
| 2002/0194058 A1 | 12/2002 | Eldering | |
| 2003/0033199 A1* | 2/2003 | Coleman | 705/14 |
| 2003/0036979 A1* | 2/2003 | Tokorotani | 705/27 |
| 2003/0168510 A1* | 9/2003 | Allen | 235/380 |
| 2003/0222134 A1 | 12/2003 | Boyd | |
| 2004/0044627 A1* | 3/2004 | Russell et al. | 705/50 |
| 2004/0172343 A1 | 9/2004 | Allibhoy et al. | |
| 2004/0225609 A1* | 11/2004 | Greene | 705/40 |
| 2004/0230593 A1* | 11/2004 | Rudin et al. | 707/100 |
| 2005/0038699 A1 | 2/2005 | Lillibridge et al. | |
| 2005/0114206 A1* | 5/2005 | Bennett | G06Q 30/02 705/14.55 |
| 2005/0131758 A1* | 6/2005 | Desikan et al. | 705/14 |
| 2005/0246736 A1* | 11/2005 | Beyda | H04N 21/6582 725/35 |
| 2005/0251445 A1* | 11/2005 | Wong | G06Q 30/0242 705/14.69 |
| 2006/0074769 A1 | 4/2006 | Looney et al. | |
| 2006/0080238 A1* | 4/2006 | Nielsen et al. | 705/40 |
| 2006/0161599 A1 | 7/2006 | Rosen | |
| 2006/0178935 A1 | 8/2006 | Barton et al. | |
| 2006/0178986 A1 | 8/2006 | Giordano et al. | |
| 2006/0287919 A1* | 12/2006 | Rubens et al. | 705/14 |
| 2007/0033106 A1* | 2/2007 | Mason | G06Q 30/02 705/14.69 |
| 2007/0038516 A1* | 2/2007 | Apple et al. | 705/14 |
| 2007/0067267 A1* | 3/2007 | Ives | 707/3 |
| 2007/0067297 A1* | 3/2007 | Kublickis | 707/9 |
| 2007/0124425 A1* | 5/2007 | Gross | 709/217 |
| 2007/0244809 A1* | 10/2007 | Meeks | 705/39 |
| 2007/0260508 A1* | 11/2007 | Barry et al. | 705/14 |
| 2008/0004884 A1 | 1/2008 | Flake et al. | |
| 2008/0005313 A1 | 1/2008 | Flake et al. | |
| 2008/0010206 A1 | 1/2008 | Coleman | |
| 2008/0086365 A1* | 4/2008 | Zollino et al. | 705/10 |
| 2009/0150238 A1* | 6/2009 | Marsh et al. | 705/14 |

OTHER PUBLICATIONS

"How Mint Personal Finance Management Protects Your Financial Safety—Financial . . . ", http://www.mint.com/safe.html, 2 pgs., accessed Jul. 31, 2008.

International Application No. PCT/US07/80092, PCT International Search Report, dated Oct. 1, 2008, 3 pages.

International Application No. PCT/US07/80092, The Written Opinion of the International Searching Authority, dated Oct. 1, 2008, 4 pages.

EPO Communication for Supplementary European Search Report, Application No. EP 07 84 3619; dated Mar. 2, 2011, Date of completion of search Jan. 28, 2011; 6 pgs.

Hellauer, Brian "Banks Take Aim at Target Marketing" XP-001130643; Midcon Conference Record, Ventura, CA, US, Feb. 1, 1993 (Feb. 1, 1993), 6 pgs.

Office Action of corresponding Chinese Patent Application No. 200780038397.1, dated Mar. 24, 2015, 6 pages.

Notice of Allowance for corresponding Chinese Patent Application No. 200780038397.1, dated 206-07-13, 4 pages.

* cited by examiner

PERSONALIZED CONSUMER ADVERTISING PLACEMENT

This application claims priority to application Ser. No. 60/849,156 filed Oct. 2, 2006, which is incorporated by reference in its entirety herein.

BACKGROUND

Field

The present embodiments relate generally to the collection of consumer financial transaction expenditure data for mining according to defined criteria provided by advertisers, ad agencies, and other applicable organizations. In particular, the embodiments relate to data architecture and processing, and a database solution that will ultimately deliver personalized advertising/ads to consumers based on the financial history of the consumer while protecting the consumer's anonymity.

As a result of the mined financial data, advertisements/promotions will be electronically routed to potential and in some cases current customers of a marketer/advertiser for their viewing. Consumers matching a desired profile for an advertisement campaign will view the targeted advertisements/promotions when they sign on to their account at a financial institution or when they log on to a web site that subscribes to the system.

Description of Related Art

Advertisers are constantly searching for more efficient means to allow their products/services to be advertised to consumers who have a need for their products/services or who are currently spending money on similar products/services with a competitor. In essence, advertisers are constantly faced with finding the consumer who is "ready" to purchase their products/services, "able" to complete the purchase of their products/services, and "willing" to purchase the products/services immediately ("RAW"). With the advent of newer technologies such as Digital Video Recorders (DVRs) and On Demand TV, advertisers fear the loss of traditional means of advertising to consumers.

Current options for electronic web based advertising are very costly and yield limited results. To reach an acceptable number of consumers to advertise their products/services advertisers must run campaigns, which reach masses of people but only yield single digit return in consumer interest and purchases. For example out of 100 consumers who see an advertiser's campaign/ad, only 3-5 may be RAW. Despite their best efforts, current consumer advertising methods remain very costly and yield a minimal return for the amount of investment.

One problem with present online advertising is called a shotgun approach. In this approach, an advertiser/marketer buys a word that is typed into an internet search engine. When purchasing this word or phrase the marketer/advertiser is thinking, "based on this word I think that xx % might be interested in my product". The problem is those words are very expensive. Internet advertisers are getting market rates such as between $5.00 and $10.00 per word per click to have a good placement on a web site per a single word or two word phrase. Moreover, the marketer/advertiser does not know whether the consumer who views their advertisement is RAW.

Marketers have been able to develop ways to maintain customers once they have initiated purchases via tracking of the consumers purchasing habits and trends. Special loyalty programs have been developed such as reward coupons and other incentives based on the amount, frequency, and trends of the consumers purchases. Other advertisers/on-line retailers such as Amazon.com profile the customers who actually visit their site. With Amazon, the consumer is profiled by the products they view and what they purchase while on the site. Amazon then tracks the consumer's habits of shopping and what they purchased so that when the consumer signs in at another time advertisements will immediately pop up with "suggested items" for the consumer to consider purchasing based on their previous actions and purchases with Amazon only. While these approaches are effective in maintaining already existing customers and motivating the consumer to purchase additional items, they fall short in their ability to secure additional customers from competitors who offer similar products/services. The current advertising methodologies are still unable to track actual consumer spending and trends outside of an already existing customer, i.e. based on a broad spectrum of actual financial transactions within the consumer's financial institution(s).

There is a need for a personalized advertising architecture/solution, which allows electronic transmissions of consumer financial transactions/expenditures or related data to be loaded and managed in a database of an advertising delivery provider for specifically targeted advertising/ad promotions.

SUMMARY

Consumers are identified with their actual consumer financial expenditures so that they can be mined and sorted within a database according to specific advertising/ad criteria provided by marketers, advertisers, ad agencies, and other applicable organizations to match a desired consumer profile with consumers of such a profile. The subject personalized consumer advertising/ad placement system provides the ability for marketers, advertisers, ad agencies, and any other applicable organization to determine and electronically present their "ideal" consumer profile, or market segment, and have their advertisement/promotion placed in front of all consumers who match the profile based on the mining of the consumers actual spending across a broad base of financial transactions and other non-personal information. The ability to allow any advertisers/ad agencies regardless of business or specific merchant focus, the ability to "create" a "custom" profile for specific consumers within a certain market, within a geographical location, with a certain monthly income from the consumer's actual financial transactions within their financial institution(s) would be advantageous and unique compared to any technologies on the market today.

By way of introduction only, a personalized consumer advertising/ad architecture/solution may include the presentation of personal and targeted advertisements/promotions prepared by an advertiser, ad agency, or any other applicable organization, transferred electronically to a web site entered by the consumer for electronic review and response.

An embodiment of the personalized consumer advertising/ad architecture/solution enables non-personal consumer transaction data to be transferred electronically from any financial institution to an advertisement delivery provider's database. This financial data can consist of checking account transactions, credit card transactions, and loan information as well as any other purchase or financial transactions that may pertain.

The advertisement delivery provider will house all transactional data in its secure, industry compliant database (software and hardware). Each set of consumer transactions will be provided a key number by the financial institution as the data is passed to the advertisement deliver provider's database. This key number will be maintained by the financial institution to enable the mined data with the corresponding ads/promotions from the advertisers to be married back together with the consumer for placement on the consumer's computer after mining.

The advertisement delivery providers will interact with outside marketers, advertisers, ad agencies and other applicable organizations to secure their individual consumer advertising profiles for specific products/services to be advertised to consumers. The marketer, advertiser, ad agency, or other organizations will be able to provide the exact target consumer they would like to view their ad/promotion. An example might be a home improvement store which might establish a profile with the advertisement delivery providers to place a specific ad/promotion in front of all consumers within 20 miles of Cleveland, having spent over $500 in the past 6 months on home improvements, who engages in transactions with Lowes, Sears, Ace Hardware, and TrueValue, and who have a total income of over $8,000 per month. The advertisement delivery provider would then mine its database containing all of the financial transactions from multiple financial institutions only identifying those consumer accounts, which fit these specific criteria.

Pricing for the data mining provided by the advertisement delivery provider will vary based on the number of levels of segmentation the marketer, advertiser, ad agency, and other organizations may specify. The more targeted the consumer audience requested by an advertising organization, the more the cost to have the ad displayed will escalate. An example of costs would be the home improvement scenario used above. There were four levels of criteria specified and each level cost $1.00, thus the total cost would be $4.00 to the advertiser for every ad opened by the targeted consumer. Also, the pricing can be determined as whether an advertisement has simply been displayed, or whether an advertisement has been displayed and clicked.

Through the use of the personalized consumer advertising/ad architecture/solution, consumers will be able to see new promotions and ads every time they sign in to their on-line financial institution web account as well as when they surf to web sites not affiliated with a financial institution. Consumers can be flagged unobtrusively as they enter these sites as to how many new ads/promotions have been provided to them since their last sign in.

The advantage of the personalized consumer advertising/ad architecture/solution is that only ads/promotions appearing for the consumer can be for services/products they are currently spending their money on, or have an immediate interest in, across all categories of purchase. Consumers may receive ads/promotions, which have discounts at retail stores, restaurant coupons, special promotions and rebates on automobiles etc. to name a few of the types of ads/promotions.

A second advantage of the invention is the ability for the advertisement delivery provider to create an electronic bridge from the financial institution to the advertiser for the benefit of the consumer. The financial institution can now provide an additional service offering by placing ads, promotions, and coupons directly in front of a consumer for not only the things they have interest in but in addition are purchasing currently.

A third advantage is that the consumer remains anonymous to the advertiser, despite seemingly having a direct communication from the advertiser upon the consumer's signing on to the financial institution's web site. If the consumer chooses to ignore the advertisement (no click) then the advertisement may expire after a selected time-out or upon the completion of the advertising campaign.

The foregoing summary is provided only by way of introduction. All features, benefits, and advantages of the personalized consumer advertising/ad architecture/solution may be realized and obtained by instrumentalities and combinations particularly pointed out in the claims. Nothing in this section should be taken as a limitation on the claims, which define the scope of the invention.

The subject development is also applicable to the other entities or financial institutions who maintain personalized web sites in association with customers' financial data, such as insurers, investment counselors, brokers or the like.

DESCRIPTION OF THE EMBODIMENTS

Figure 1:
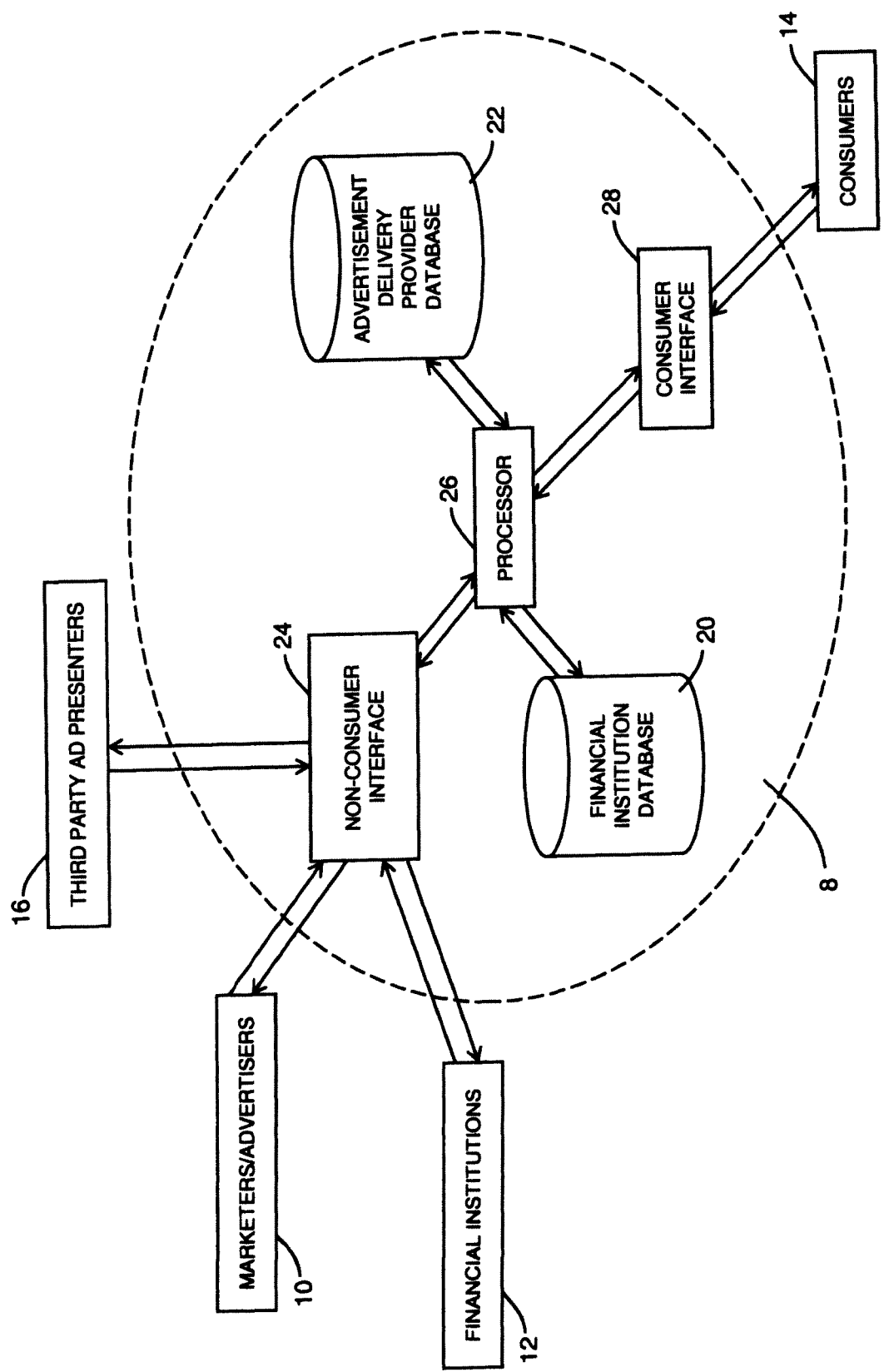
FIG. 1 is a block diagram depicting a system for selectively delivering advertisements.

The following is a description of a system and a method for delivering targeted advertisements to consumers over a network, such as the Internet or similar integrated network. An example of such a system will be described so that one can make the system; however, the embodiments, which are defined by the appended claims, are not limited to only the system described below. With reference to FIG. 1, the system 8 allows for communication among the following individuals or entities: marketers 10, financial institutions 12 and consumers 14. The system can also allow companies or entities that are not financial institutions to allow for the delivery of advertisements on their web sites or other communication platform—these entities will be referred to as third party advertisement presenters 16.

The marketers 10 are companies or individuals who wish to deliver an advertisement to the consumers 14. More particularly, the system allows marketers 10 to deliver advertisements to consumers who are ready, able and willing (RAW) to buy the products or services offered by the marketer. The consumers 14 are also customers of at least one of the financial institutions that share information within the system. The financial transactional history of the consumers, which is provided by the financial institutions, is used to define a market segment that will receive targeted advertisements over the network. The financial institutions 12 can include banks, savings and loans, credit unions, retailers and the like. The third party advertisement presenters 16 operate web sites that are not affiliated with the any of the financial institutions (or are unsecure web sites that are operated by the financial institutions) that allow for the delivery of advertisements. The system is designed to maintain the anonymity of the consumers while allowing the marketers to have their advertisements delivered to consumers who fall within their defined market segment.

Generally the system includes a secure database 20 (or a plurality of secure databases) that is/are operated by the financial institutions 12. The financial institution secure database 20 stores, or warehouses, the financial transactions (and other financial information) of the customers of the financial institution along with other non-financial information. These financial transactions can include the debits and credits of the customers of the bank, the loans that are held by the bank for that customer, credit/debit card transactions and the like. The other information about the customer that is stored in the financial information secure database 20 includes information such as the identity of the customer, the age and sex of the customer and the home zip code of the customer. This customer information is associated with a unique customer identification code (UCIC) that associates the customer to the information while still maintaining the anonymity of the customer. By anonymity is meant that the information communicated to the advertising delivery provider precludes the provider from knowing who the consumer really is so that the "cookie" presented to the consumer is anonymous. Accordingly, the UCIC can be referred to as an anonymous coding. For example, the UCIC is not based on the name, address or social security number of the customer, which could lead to the identity of the customer becoming known. The UCIC is tied to the financial transactions of the customer, the age and sex of the customer, and the zip code of the customer; however, more personal information, such as the social security number, phone number, credit card numbers and the name of the customer, is not associated with the UCIC, thus protecting the identity of the customer.

The system also includes a secure database 22 that is operated by advertisement delivery provider. This database 22 associates the UCIC with the information that is similar to that stored in the financial institutions databases. The advertisement delivery provider database 22 stores, or warehouses, the financial information and other non-personal information that it receives from a number of different financial institutions. The advertisement delivery provider database 22 also associates an advertisement delivery identification code (ADIC) and a financial institution identification code (FIIDC) for each individual customer stored in its database and associates these codes with the UCIC that is provided by the financial institution database. The ADIC is unique to each customer stored in the database. The FIIDC is associated with the financial institution that has the provided the customer information for the unique customer. Since the UCIC maintains the anonymity of the consumer to which it is matched, the ADIC and the FIIDC also maintain that anonymity of the consumer because no personal information is matched to these codes. Accordingly, the UCIC and the FIIDC can also be referred to as anonymous codings.

The system 8 also includes a first interface 24, or portal, which will be referred to as a non-consumer portal, that allows marketers 10, financial institutions 12 and third party advertisement presenters 16 to communicate with the advertisement delivery provider database through a processor 26, which runs system software and is operated by the advertisement delivery provider. The system further includes a second interface 28, which will be referred to as a consumer portal, through which consumers 14 will receive targeted advertisements based on non-personal information that is known about the individual consumer who has logged onto the consumer portal 28.

Generally, the method for delivering targeted advertisements to consumers includes a marketer 10 defining a market segment, a financial institution 12 providing a base of customers from which the market segment can be drawn, and an entity (the advertisement delivery provider) that delivers advertisements to consumers that are within the defined market segment. A market segment is group of people or entities that share one or more characteristics that cause them to have similar product needs. A method for delivering targeted advertisements to consumers will be described in detail so that one skilled in the art can practice the method; however, the order in which the steps of the method are practiced can deviate from the order in which they are depicted in the FIGURES.

Figure 2:
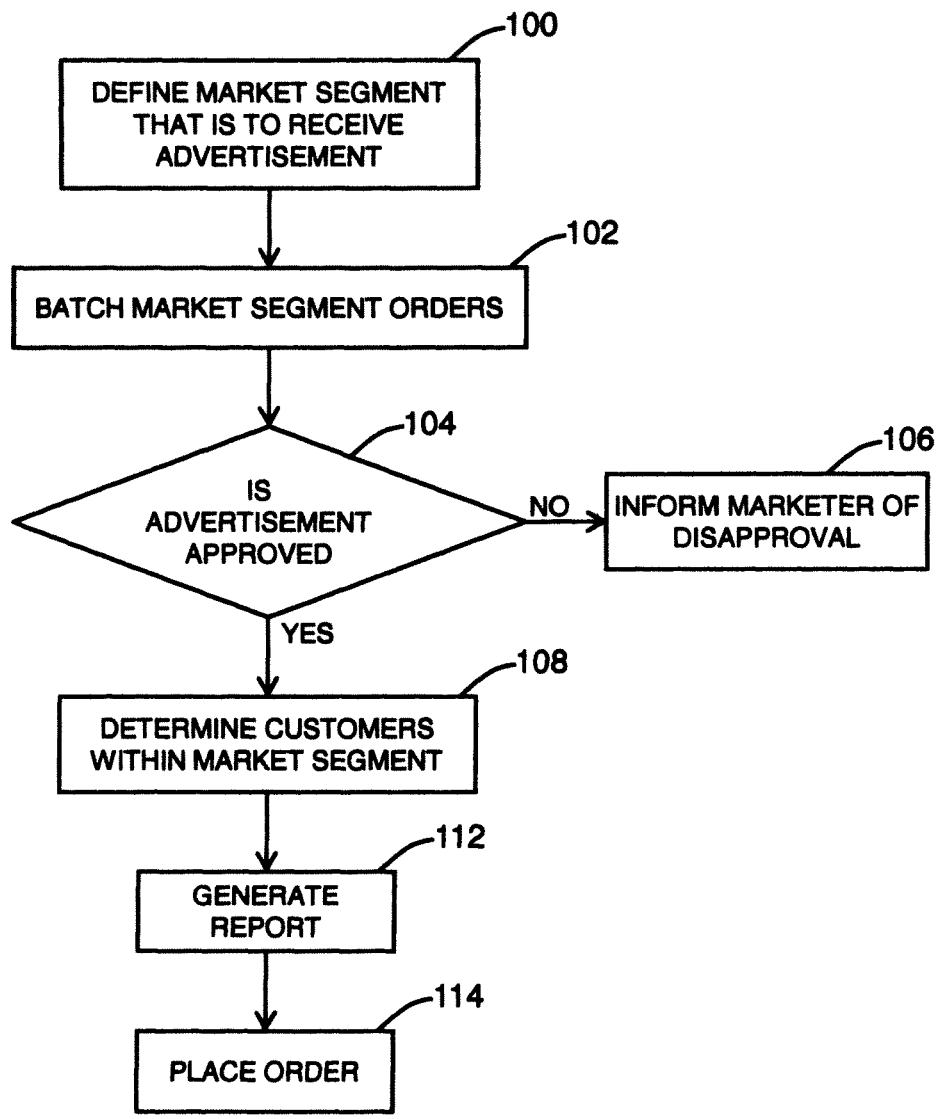
FIG. 2 is a flow diagram depicting a process for ordering an advertisement to be delivered to a consumer.

FIG. 2 depicts steps that can be carried out by the marketer to deliver targeted advertisements to consumers. The marketer is the entity that desires to sell a product or a service and therefore wishes to advertise its products or services. The marketer can also simply wish to deliver advertisements to a market segment and not be in the business of selling a product or service, e.g. a charitable organization. At 100 the marketer defines a market segment that is to receive an advertisement. Prior to defining the market segment, the marketer will typically have developed an advertisement that it would like to deliver to a consumer who is within the defined market segment. For example, a marketer desiring to sell sport cars may define the market segment to be females who have a monthly car payment of over $450. The market segment could be narrowed, for example to where a consumer lives, the number of car payments that the consumer may have left on a car loan or lease, the monthly deposits made into the consumer's checking or savings account and other information that may be relevant in determining whether the consumer is in the market for a sports car. As will be described with more detail with reference to FIGS. 3 and 4, the market segment can be defined solely by the marketer or the market segment can be defined with the aid of software utilized within system.

With continued reference to FIG. 1, at 100 the market segment is defined by the marketer filling out an order screen, which in the depicted system embodiment is a web portal (non-consumer portal 24 in FIG. 1) that is operating the software that facilitates defining the market segment. Financial institution customers that fall within the market segment comprise the group of consumers who will receive the targeted advertisement of the marketer, which in the example described above is an advertisement for a sports car.

At 102, market segment order data is batched with other market segment order data that has been received from other marketers or with market segment order data that has been received from the same marketer requesting advertisements be delivered to a different market segment. The market segment data is batched in the advertisement delivery provider database 22 (FIG. 1).

At 104, the site (or sites) that is/are to present the advertisement approves or disapproves of the advertisement (s) that are to be delivered on its site. Typically, the site where the advertisement is to be presented is the secure web site where the financial institution's customer performs transactions over the network (e.g. the financial institution's secure web site). Nevertheless, the site where the advertisement is to be delivered can also include unsecure web sites (e.g. cnn.com, espn.com and the like). If the advertisement is not approved, then at 106 the marketer is informed of this decision and can also be given the reason for the disapproval of the advertisement. More description of the process involved in approval of the advertisement is described at FIG. 4.

If the advertisement is approved by at least some of the operators of web sites that are to display the advertisements, than at 108, the order data is processed to determine the customers who fall within the market segment. The advertisement delivery provider database 22 (FIG. 1) is queried by the software on the processor 26, which may include the database 22, to locate customers that fall within the market segment. In this database, each consumer, who is also a customer of one of the financial institutions that is a part of the system, is associated with a financial institution identification code (FIIDC), a unique customer identification code (UCIC) and an advertisement delivery identification code (ADIC). As stated above, each customer in the advertisement delivery provider database is associated with a customer identification that is not traceable back to the customer. Only the financial transaction history, which has been provided by the financial institutions, and other non-identifying information (e.g., zip code, sex, age) is stored in the advertisement delivery provider database and associated with the FIIDC, the UCIC and the ADIC for each individual customer. The UCIC is merely an anonymous profile that does not contain any means to identify the customer, i.e. name or social security number, other than the transactional financial history of the customer. Accordingly, the marketer is able to deliver an advertisement to a consumer who is ready, willing and able to purchase the good or service offered by the marketer; however, the identity of the consumer by the marketer and the advertisement delivery provider remains unknown.

The ADIC also designates the customer, however, this identification is assigned by the software of the system, which is operated by the advertisement deliver provider as opposed to by the financial institutions. The ADIC is most useful when the consumer logs onto a web site other than a secure web site operated by one of the financial institutions that is operating within the system. The ADIC provides an identification of the consumer that can be linked back to the UCIC and the financial information that is associated with the UCIC. When a consumer logs onto a secure financial institution's web site, which will be described in more detail below, the UCIC, which has been assigned by the financial institution, is already known because the financial institution knows the identity of its customer. However, the financial institution does not share the "true identity" (the "true identity" being an identifying characteristic that would allow the identity of the customer to be known to the advertisement deliver provider). Instead the financial institution only provides the UCIC to the advertisement delivery provider which as discussed above is not traceable back to the financial institution's customer's identity. Accordingly, the financial institution is providing a database of anonymous customers each having a different financial history. Thus only the financial transactions (and other non-identifying information) of the customer are known to the advertisement delivery provider.

At 108, the database is queried to determine which customers meet the criteria of the market segment to determine the expected success of the campaign. For the sports car example mentioned above, the database is queried to determine which consumers pay over $450 per month for a car. During processing, the expected campaign success and the time it will take the advertisement to meet a predetermined number of the consumers can also be reported to the marketer. For example, where the marketer defines the market segment very narrowly only a few consumers may meet the criteria and the likelihood for success of the advertising campaign is also low or will involve an unacceptable length of time before the number of targeted consumers will receive the advertisement. The number of consumers that meet the criteria of the segment can aid in determining how many consumers will receive the advertisement that is sent out. This will be described in more detail with reference to FIG. 6.

At 112 a report is generated that is sent to the marketer via the first portal 24 (FIG. 1). The report can include such information as the number of consumers in the market segment and the time it will take for a predetermined number of views of the advertisement. The time it will take to reach a predetermined amount of consumers can be determined by the amount of times on average consumers in that market segment log on to certain web sites that allow for the delivery of these targeted advertisements.

At 114, the marketer is asked whether it wishes to place an order for advertisements to be delivered.

Figure 3:
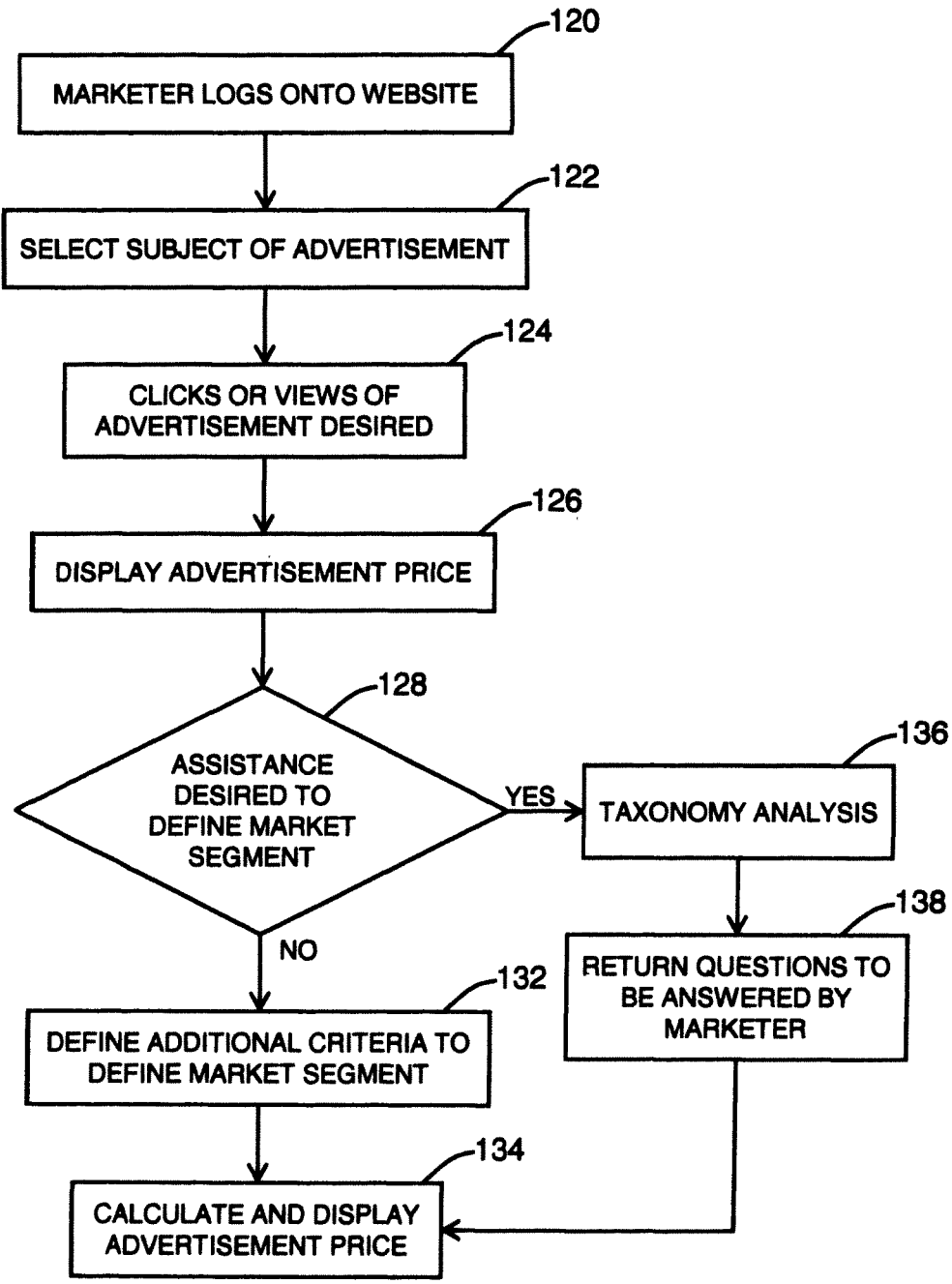
FIG. 3 is a flow diagram of a process for defining a market segment of consumers that is to receive an advertisement.

With reference back to how the market segment is defined (100 in FIG. 1), with reference to FIG. 3, at 120 the marketer logs onto a secure web site, which in the exemplary method is the non-consumer portal 24 in FIG. 1. The web site can be run by the advertisement delivery provider.

At 122 the marketer is presented with a screen that asks the marketer to select the item or service that is to be the subject of the advertisement that the marketer wishes to be delivered to consumers. In the example that is discussed above, the marketer may enter "cars" or "sports cars."

At 124, the marketer is then prompted to input the desired number of views or clicks of its advertisement that it wishes to obtain. A view is simply a posting of the advertisement on a web site that is viewed by the consumer. A click is when the consumer clicks on the advertisement and is taken to another web site, which is typically operated by the marketer, or an agent of the marketer, and further information can be provided about the service or product that is the subject of the advertisement.

At 126 the price that the marketer will pay for the advertisement to be displayed or clicked on the consumers portal 26 (FIG. 1) is displayed on the web page. The price of the advertisement can be a function of the product or service that is the subject of the advertisement. The price can also be a function of whether the advertisement is clicked or simply viewed. For example, products or services having a higher sales price will typically have a higher price per view or click and lower priced items or services will typically have a lower price per view or click.

At 128 the marketer will then be asked whether it wishes to be assisted in defining a market segment for its product or service or whether it wishes to define the market segment without assistance. If the marketer does not desire assistance in defining the market segment, for example the marketer is knowledgeable of the customers who desire its products, then at 132 the marketer is provided with additional criteria by which it can define the market segment. For example, at 132 the marketer can be presented with a grab bag of options to further define the market segment, examples of which include customers who have a current car payment that is within a certain monetary range, customers of a particular sex, customers of a particular age, customers who live in a particular zip code, etc. The grab bag of options may also include criteria that does not correlate exactly to the data stored in either the financial institution data base or the advertisement delivery provider database. For example, the grab bag could include such options: a range of money that the consumer allocates to entertainment, the amount of money spent on travel and other similar criteria. For these aforementioned criteria, the software operating on the system can be designed to calculate the entertainment budget of the customer by adding the monthly transactions of the customer such as movie tickets, concert tickets, sport events, dining, etc. Additionally, the software may factor that some of these purchases may also be in cash, which would not show up as a financial transaction in either database, and account for this by adding some percentage of the monthly total to the customer's budget. The budget can be averaged over a time period, e.g. year. At 134 the price of the advertisement is then recalculated with each additional criterion that is chosen by the marketer. The price is then displayed on the web site. The more criteria that is selected by the marketer to define the market segment, typically the higher the price of the advertisement.

If the marketer wishes to be assisted in defining a market segment for its product or service, then at 136 the product or service that is the subject of the advertisement is filtered by way of a taxonomy analysis. The taxonomy analysis classifies the good or service that is the subject of the advertisement. Based on the classification of the good or service that is the subject of the advertisement, questions are presented to the marketer to aid in defining the market segment at 138. For example, if the subject of the advertisement is a car, then the marketer can be prompted to decide whether it wishes to deliver advertisements to consumers who have paid 33 monthly installments on a car lease, which is an indication that the lease is about to expire. Another example would be if the subject of the advertisement is a home mortgage refinance product, the marketer can be prompted to decide whether it wishes to deliver advertisements to consumers who originated a mortgage in a certain year (for example, a year in which interest rates were known to be higher than they are at the time that the advertisement will be delivered). After the marketer has answered each question, which further defines the market segment, the price of the advertisement is displayed at 134 as a function of the criteria chosen by the market (by way of answering the questions).

Figure 4:
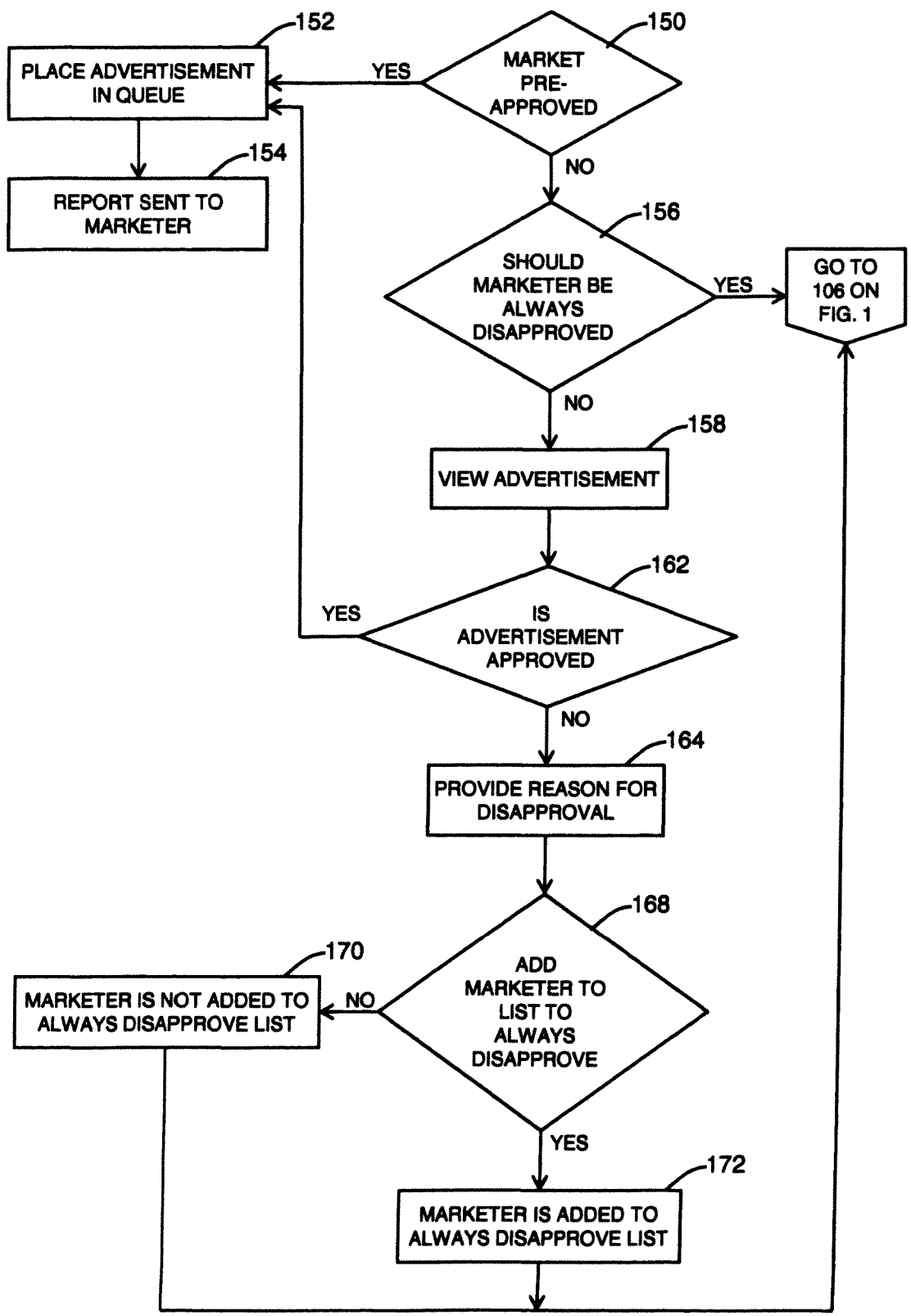
FIG. 4 is a flow diagram of a process for approving an advertisement to be displayed on a web site.

FIG. 4 more particularly describes how the site (or sites) that is/are to present the advertisement approve(s) or disapprove(s) of the advertisement(s) that are to be delivered on its site(s). At 150, the software that is operated by the advertisement delivery provider determines whether the marketer that wishes to have the advertisement displayed is a pre-approved marketer. Operators of web sites that will display advertisements can pre-approve certain marketers or classifications of marketers that are approved to display advertisements on their web sites. Whether the marketer is already a pre-approved marketer or is similar to a preapproved marketer and how many web site operators have pre-approved the marketer can have an effect on how quickly its advertisement will be viewed or clicked by the predetermined threshold of consumers that it desires to view or click its advertisement.

At 152, if the marketer has been preapproved by the web site operator that will display the advertisement, then the advertisement is automatically approved and placed in a queue of advertisements that are waiting to be viewed by customers who log onto the operator's web site and who are within the market segment that has been defined by the marketer. The queue of advertisements can be stored in the advertisement delivery provider database 22 (FIG. 1). At 154 a report can be generated and sent to the marketer informing the marketer of the web sites that have approved the marketer's advertisement.

If the marketer has not been preapproved by the web site operator, then at 156 the advertisement delivery provider determines whether the marker is a marketer or a classification of marketer that is always disapproved by the operator of the web site. If the marketer is a marketer or is in a classification that is always disapproved by the web site operator, then a report is generated, at 106 on FIG. 1, informing the marketer of the disapproval status.

If marketer is not always disapproved, then the advertisement is viewed by the web site operator at 158. The web site operator can be sent the advertisement via e-mail or the web site operator can log onto a web site, which can be the non-consumer portal 24 in FIG. 1, that is operated by the advertisement delivery provider to view the advertisement(s) awaiting approval. The web site operator then approves or disapproves the advertisement at 162. If the advertisement is approved, then the advertisement is placed in the queue at 152 and the report is generated at 154. If the advertisement is not approved, then at 164 the web site operator who was requested to display the advertisement is asked to answer why the advertisement has been disapproved. The web site operator, at 166, is also given the option to deny all advertisements from this particular marketer or classification of marketer. If the web site operator chooses to always disapprove the marketer, then at 172 the marketer is added to an always disapprove list and the marketer will always be disapproved by the web site operator. If the web site operator chooses to not always disapprove the marketer, then the marketer is not placed on the always disapprove list. The marketer is then notified that the advertisement has been disapproved by the web site operator.

Figure 5:
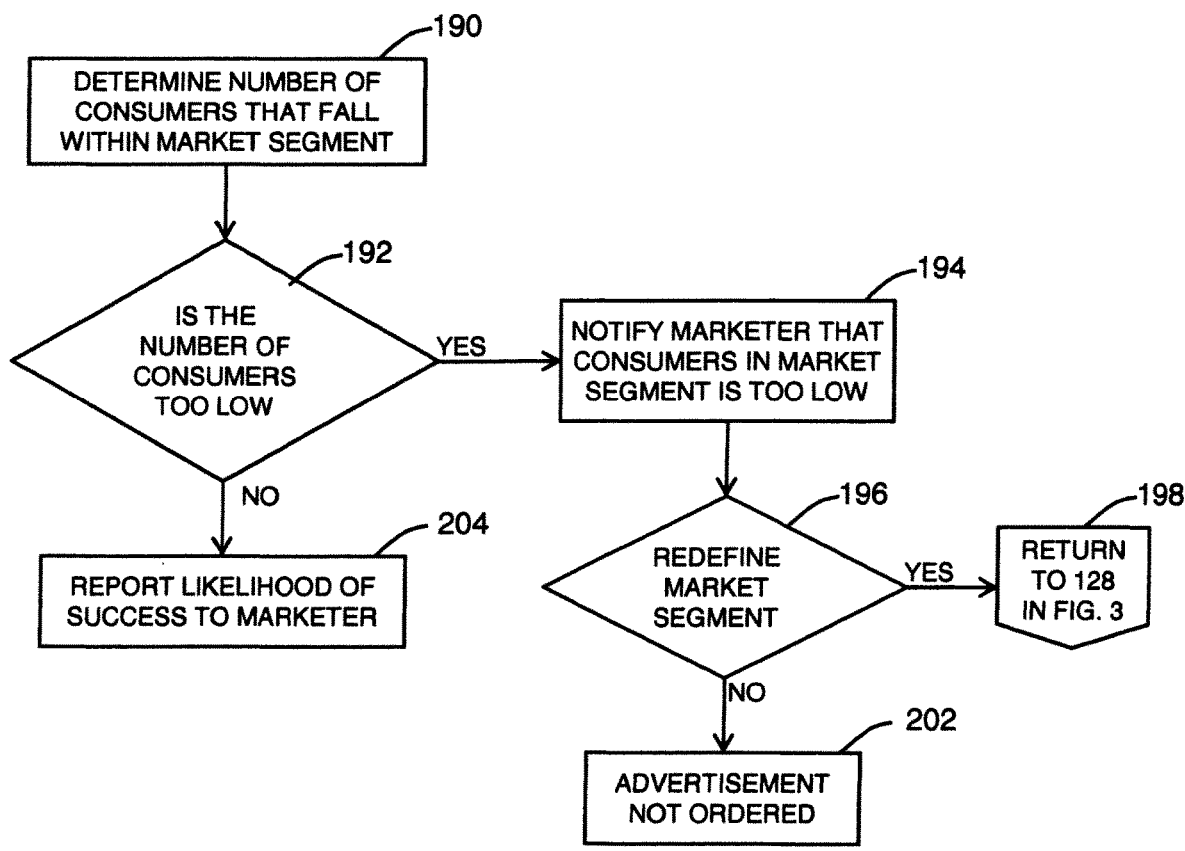
FIG. 5 is a flow diagram of a process for determining the success of an advertising campaign.

With reference back to FIG. 2, after the advertisement has been approved by the web site that is to display the advertisement—the advertisement may be displayed on a number of different web sites, each requiring some sort of approval—the projected success of the advertisement reaching the predetermined threshold of consumers is determined at 108. FIG. 5 provides a more detailed description of how the projected success is determined.

With reference to FIG. 5, at 190 the number of consumers in the advertisement delivery provider database that fall within the market segment is determined. This is accomplished by querying the advertisement delivery provider database to locate the consumers that match the market segment that has been defined by the marketer. At 192, the software running on the system determines if the number of consumers in the market segment is too low. If the number of consumers that match the market segment is too low, then, at 194, the marketer is notified that there is a small likelihood that the advertisement will be viewed by the number of consumers that the marketer would like to view the advertisement. An example of the consumers in the market segment being too low is where the marketer wishes to display their advertisement 100,000 times but the advertisement delivery provider database only returns 100 eligible consumers in the market segment, then the advertisement will most likely take too long to display 100,000 times. At 196, the marketer will be given the option to redefine the market segment to reach a greater number of consumers. If the marketer chooses to redefine the market segment, then, at 198, the marketer is returned to 128 in FIG. 3 to see if the marketer desires assistance in defining the market segment. In addition to, or in lieu of returning to fully redefining the market segment, at 198 the marketer can also be presented with recommendations for increasing the number of consumers within the market segment. The software of the system can break out the criteria used to define the market segment and suggest that if certain criteria for the market segment were to be removed then the number of consumers that could view the advertisement could be increased. For example, the marketer could be presented with the option to define the market as including both males and females, where the original market segment criteria was limited only to females. If the marketer chooses not to redefine the market segment, then, at 202, the advertisement is not ordered by the marketer.

If the number of consumers is not too low, for example if the marketer desires 100,000 views of the advertisement and 75,000 consumers qualify for the market segment, then, at 204, the software of the system returns a report to the marketer that the advertising campaign should be successful. The report can include an estimate of the time it will take the advertisement to display the desired number of views of the advertisement. This information can be based on the number of consumers who have qualified for the market segment and the web surfing habits of the consumers in the market segment.

Moving to the consumer side of the advertisement delivery process, at 220 the consumer 14 (FIG. 1), who is also a customer of the financial institution 12 (FIG. 1), logs onto the financial institution's web site. The consumer logs onto a protected portion of the financial institution's web site where the consumer must identify himself appropriately so that, for example, the financial institution allows the user to perform banking transactions over the Internet.

After the consumer logs onto the financial institution's web site software that is running on the financial institution's web site, which is also part of the system 8 (FIG. 1), checks for the presence of a cookie, or similar file, stored on the consumer's computer at 222. The cookie included is a text file that is stored on the consumer's computer that includes the ADIC. If the cookie is not present, then at 224 the software that is running on the financial institution's web site assigns an ADIC for the customer that corresponds with the UCIC for that consumer. The UCIC is known since the consumer has logged into the financial institution's secure web site, thus verifying the identity of the consumer. This ADIC is then stored as a cookie on the consumer's computer for later reference.

If the cookie is present or after the cookie has been stored on the consumer's computer, then at 226 the software queries the advertisement delivery provider database for defined market segments for advertising campaigns for which the customer qualifies. At 228, the software determines whether the customer qualifies for any market segments for advertising campaigns that are warehoused in the advertisement delivery provider database. If the customer does not belong to a defined market segment, then at 232 a non-targeted advertisement is displayed on the web site. If the customer belongs to a defined market segment, then at 234 a targeted advertisement can be displayed on the web site.

If the consumer belongs to a plurality of market segments, then a plurality of advertisements that correlate to the market segments can be delivered to the web site for display. As discussed above, the web site can display a tab that can be clicked to display all of the advertisements for which the consumer qualifies. Alternatively, the software can be designed to display only a few of advertisements that correlate to the market segments in which the customer resides. The software can be designed to deliver the advertisements for which the greatest price was paid by the marketer to have their advertisements displayed.

The consumer can also indicate to the institution that he/she is not interested in receiving any such advertisement and so the institution, or the delivery provider, will block the delivery of any advertisements to that consumer.

Figure 6:
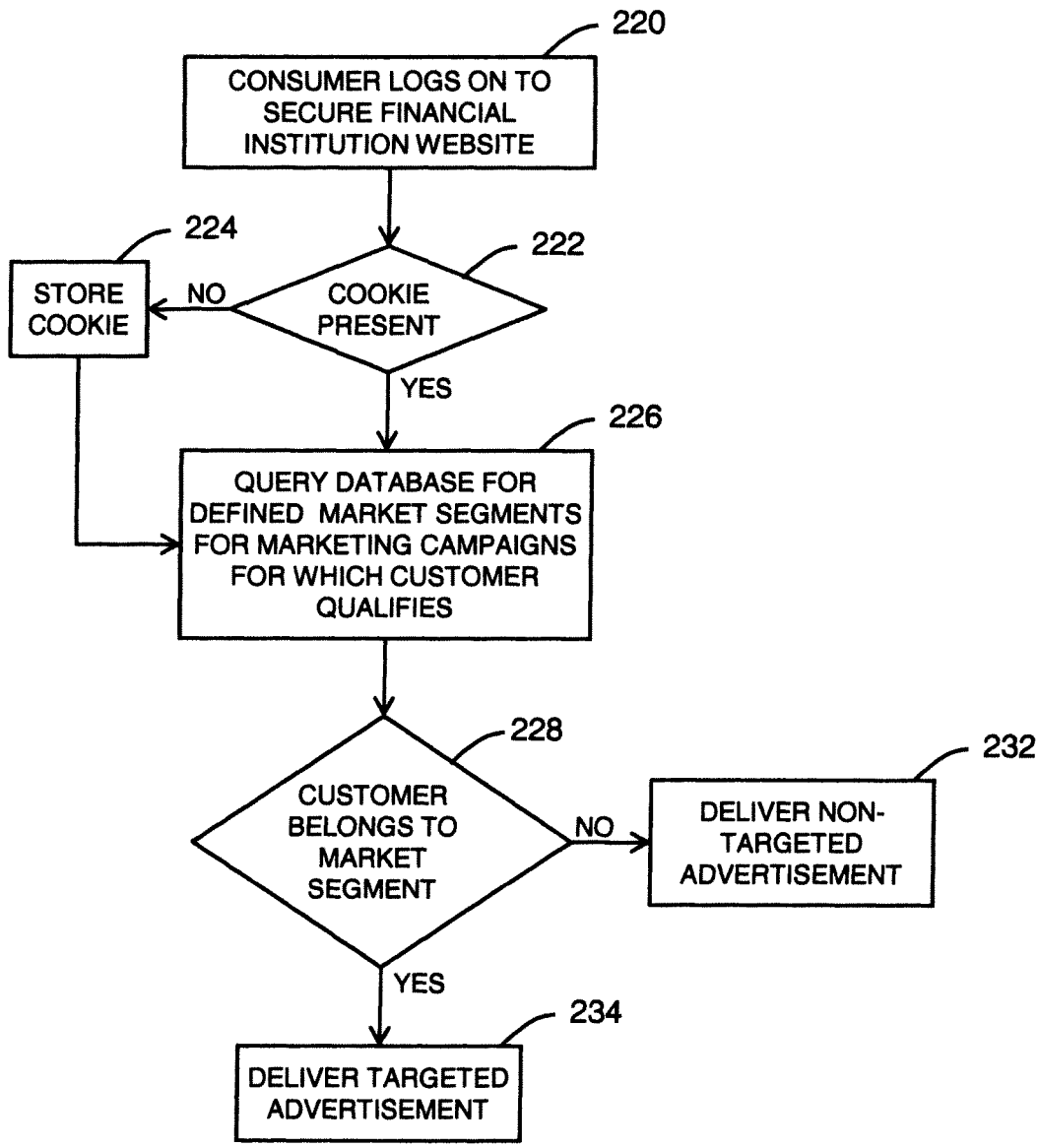
FIG. 6 is a flow diagram depicting a process for delivering an advertisement to a consumer.
Figure 7:
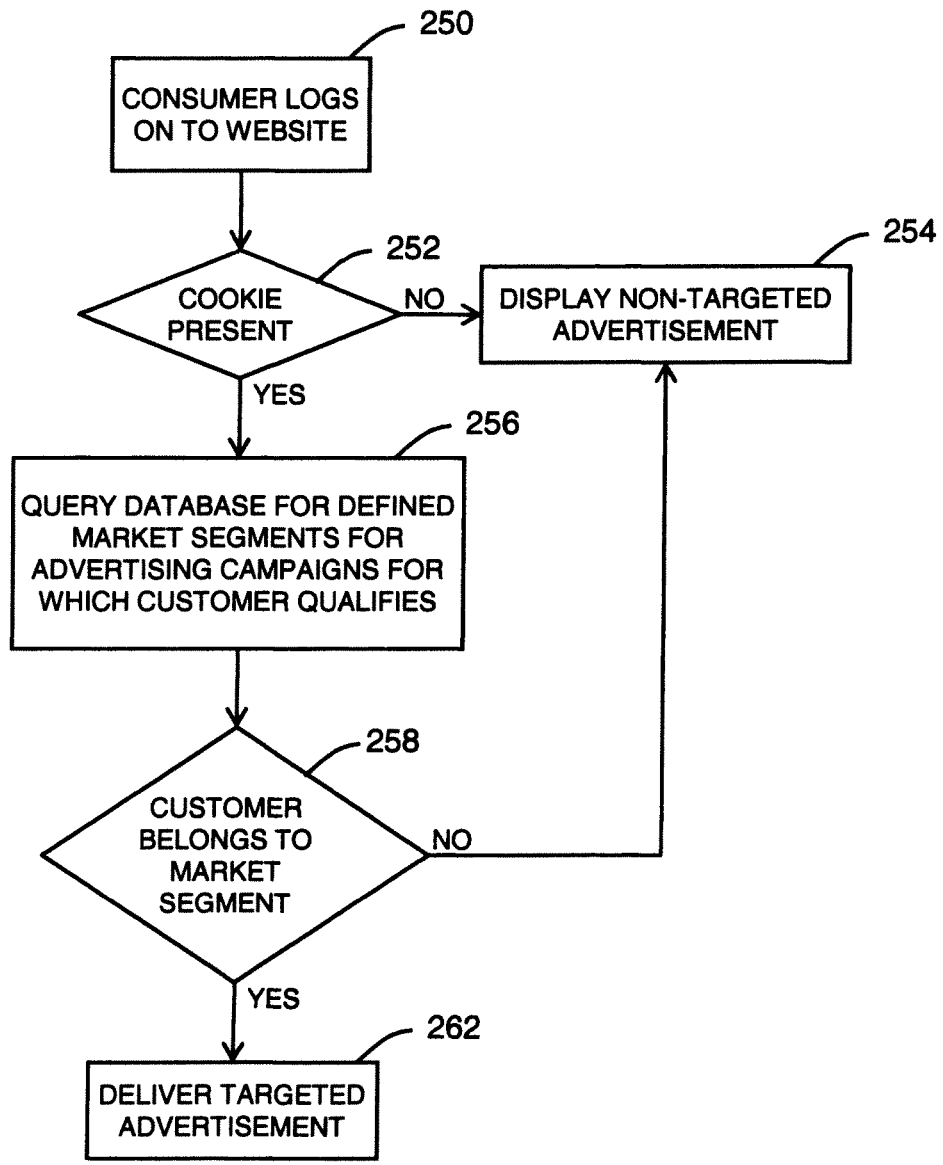
FIG. 7 is a flow diagram of another process for delivering an advertisement to a consumer.

With reference to FIG. 7, where a consumer logs onto a web site that is operated by a third party advertisement presenter, i.e. a web site that is not a secure web site of a financial institution (e.g. cnn.com, espn.com) the process for delivering an advertisement is slightly altered as compared to the process depicted in FIG. 6. At 250 the consumer logs onto a third party advertisement presenter's web site. At 252, the software running on the third party presenter's web site checks for a cookie containing the ADIC. If the cookie is not present, at 254, a non-targeted advertisement is delivered to the web site for the consumer to view. If the cookie is present, then at 256 the software queries the advertisement delivery provider database for defined market segments for advertising campaigns for which the customer qualifies. At 258, the software determines whether the customer qualifies for any market segments for advertising campaigns that are warehoused in the advertisement delivery provider database. If the customer does not belong to a defined market segment, then at 254 a non-targeted advertisement is displayed on the web site. If the customer belongs to a defined market segment, then at 262 a targeted advertisement can be displayed on the web site.

Similar to the process defined with regard to FIG. 6, if the consumer belongs to a plurality of market segments, then a plurality of advertisements that correlate to the market segments can be delivered to the web site for display. As discussed above, the web site can display a tab that can be clicked to display all of the advertisements for which the consumer qualifies. Alternatively, the software can be designed to display only a few of advertisements that correlate to the market segments in which the customer resides. The software can be designed to deliver the advertisements for which the greatest price was paid by the marketer to have their advertisements displayed. In other words, an advertisement that costs $10 per display will have a greater likelihood of being delivered to a web site than an advertisement that costs $5.

Figure 8:
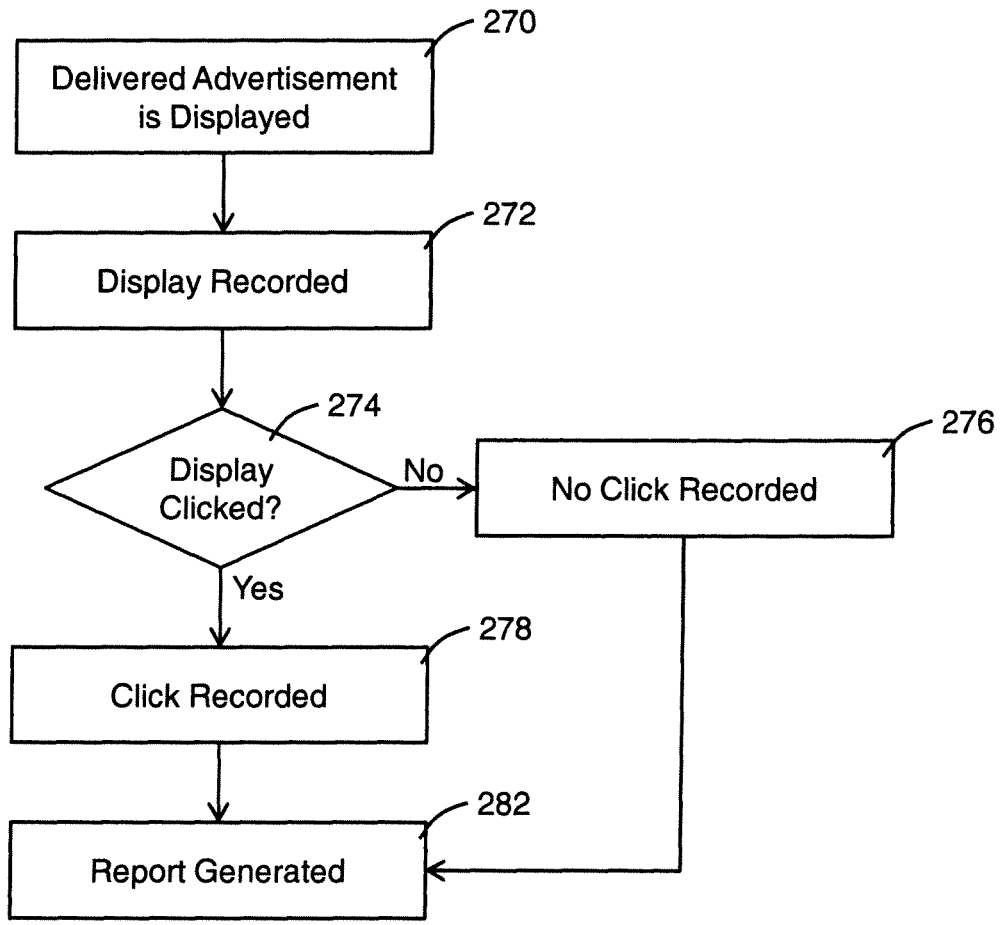
FIG. 8 is a flow diagram for a method for recording the display and the click of a targeted advertisement.

With reference to FIG. 8, the results of the advertisement display are reported to the marketer. At 270 the delivered targeted advertisement is displayed on the web site that the consumer is viewing (whether the web site is the secure web site of a financial institution or a third party advertisement presenter's web site). At 272 the software of the system records that the advertisement has been displayed. At 274 the software determines whether the advertisement has been clicked. If the consumer does not click on the advertisement, then this action is recorded at 276. If the consumer does click on the advertisement, then the consumer is directed to another web site, typically operated by the marketer, and this action is recorded at 278. At 282 a report is generated that is sent to the marketer that provides the results of the advertising campaign. Since the marketer can pay for an advertisement on a "view or display" basis and on a "click" basis, the report can provide a basis for billing the marketer for the advertising campaign. Moreover, the report can provide the marketer information such as the percentage or viewed advertisements that were clicked, which will be helpful in defining future market segments for similar products.

Figure 9:
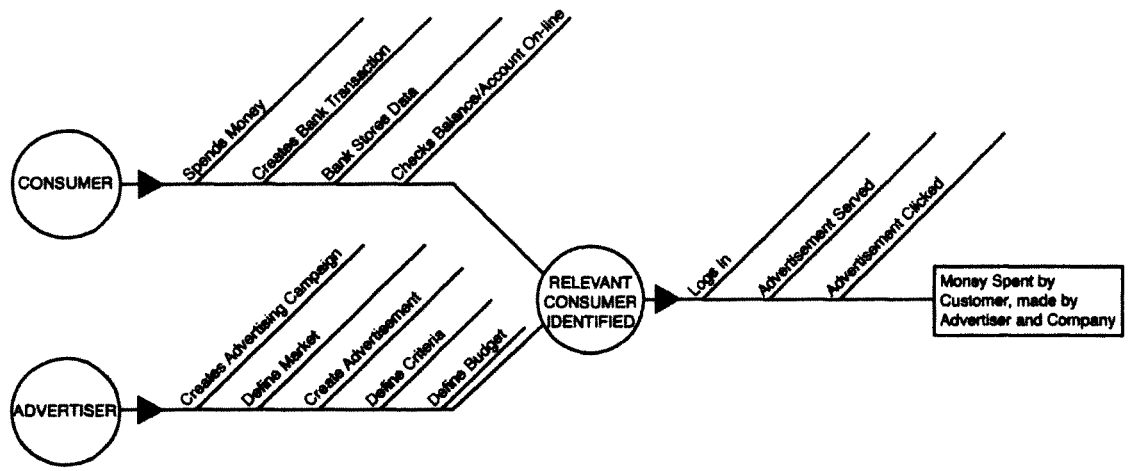
FIG. 9 is a schematic diagram illustrating the pertinent activities of the consumer and advertiser in the context of the present embodiment.

FIG. 9 is a schematic diagram illustrating the pertinent activities of the consumer and advertiser in the context of the present embodiment.

Figure 10:
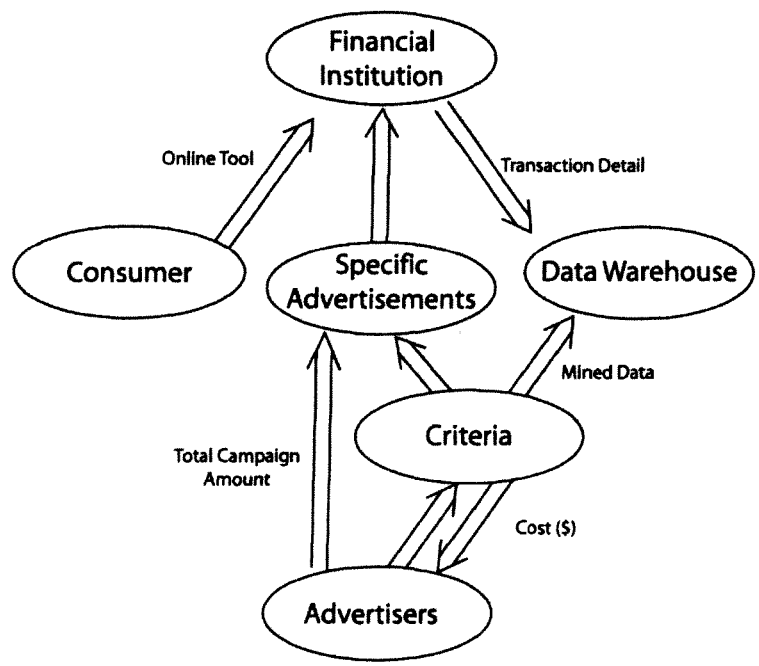
FIG. 10 is a diagram showing communication paths between consumers, advertiser, the bank and the advertisement delivery provider.

FIG. 10 is a diagram showing communication paths between consumers, advertiser, the bank and the advertisement delivery provider.

A method and system for delivering targeted advertising has been described with reference to specific embodiments. Modifications and alterations will occur to those upon reading and understanding the preceding detailed description. The invention is not limited to only those embodiments described above. Instead, the invention is intended to cover all modifications and alterations that come within the scope of the appended claims and the equivalents thereof.

The invention claimed is:

1. A method for selectively delivering consumer-unsolicited internet advertising by an advertising delivery provider to a set of consumers in a pre-existing association with a financial institution, wherein an ad is delivered through a communication platform of the financial institution, including:

the advertising delivery provider receiving anonymous records from the financial institution identified by anonymous codings for delivery of internet advertising and forming an anonymous relationship between the consumers and the advertising delivery provider, the anonymous codings comprising a unique consumer identification code (UCIC) associated with each consumer and a financial institution identification code (FIIDC) that identifies the financial institution, the anonymous records further comprising consumer records of financial activity and lacking both personal identity information and an indication of a consumer preference for delivery of internet advertising;

the advertising delivery provider collating, via a processor, the anonymous records in response to a targeted advertising program received from a marketer:

the advertising delivery provider creating identification codes that are unique to the consumers, assigning an identification code to each consumer, and associating the assigned identification code with one specific computing device via which the corresponding consumer is logged into the communication platform of the financial institution, wherein the identification code provides an anonymous identification of the consumer that is linked to the UCIC and the FIIDC;

the advertisement delivery provider matching the anonymous records to the targeted advertising program and identifying matches by selecting indicators from the consumer records matching the targeted advertising program;

the advertising delivery provider creating a list of targeted corresponding anonymous codings associated with the anonymous records identified as matching the targeted advertising program, the list comprising a market segment selected for receipt of an ad comprising the advertising campaign;

the advertising delivery provider receiving a signal from the financial institution indicative that a determined anonymous coding corresponding to a consumer of the market segment is on the communication platform;

the advertising delivery provider communicating the ad to the financial institution for display as the unsolicited advertisement to the corresponding consumer via the communication platform of the financial institution in direct response to the financial institution signal and without consumer authorization therefor, and wherein the anonymous relationship is maintained during the communicating;

the advertising delivery provider monitoring click activity while the ad is displayed to the consumer to determine if the displayed ad has been clicked by the consumer;

upon determining that the ad has been clicked and the consumer redirected to a website corresponding to the ad or the targeted advertising program, recording the click activity for including in a report generated for the marketer, and if the ad has not been clicked, recording that the ad has not been clicked for including in the generated report.

2. The method of claim 1 wherein the anonymous coding is associated with the financial records by the financial institution.

3. The method of claim 1 further including cross-referencing the financial institution identity and anonymous coding to a cookie that is stored on a computer of the consumer.

4. The method of claim 1 further including generating the targeted advertising program to include a desired number of consumers matching the advertising program and delivering an ad to the consumers within a selected time period.

5. The method of claim 4 further including generating a campaign report indicating a number of consumers viewing the advertising within the time period, and communicating the campaign report to an advertiser who has defined the market segment.

6. The method of claim 1 including charging an advertiser who generated the advertising based on the receipt of the ad.

7. The method of claim 6 wherein the charging is further based on a number of consumers receiving the ad.

8. The method of claim 7 wherein the charging is further based on a number of consumers who click-through on the delivered ad.

9. The method of claim 6 wherein the generating a market segment comprises defining target consumers having a selected set of consumer characteristics within the anonymous records corresponding to the selected indicators.

10. The method of claim 9 wherein the charging comprises determining a pricing for the ad as a function of a number of criteria chosen to define the market segment.

11. The method of claim 1 further including delivering the ad by displaying the targeted advertising program on the communication platform of the financial institution.

12. The method of claim 1 wherein the anonymous coding comprises the unique customer identification code (UCIC), and wherein the matching determines that the UCIC corresponds to the financial records that match the market segment.

13. The method of claim 1, wherein the anonymous coding comprises the unique customer identification code (UCIC) assigned by the financial institution and wherein the identification code comprises an advertisement delivery identification code (ADIC) assigned by the processor of the advertising delivery provider, and wherein the processor determines that the ADIC corresponds to the market segment.

14. The method of claim 13, wherein the ADIC is stored in a cookie that is placed on the consumer's computer any time the consumer logs on to the communication platform of the financial institution.

15. The method of claim 1, wherein the identification code comprises an advertisement delivery identification code (ADIC) that corresponds to the market segment, and wherein the ADIC is stored in a cookie that is placed on the consumer's computer any time the consumer logs on to the communication platform.

16. The method according to claim 15, wherein the cookie comprises a text file that is stored on the consumer's computer and comprises the ADIC.

17. The method of claim 1 further including communicating a cookie along with the ad to be set on a computer of the corresponding consumer, for tracking internet activity of the corresponding consumer.

18. The method according to claim 1, wherein the communication platform of the financial institution is a website.

19. A method for selectively delivering consumer-unsolicited internet advertising by an advertising delivery provider to a set of consumers having a preexisting customer relationship with a financial institution through a communication platform of the financial institution, wherein the financial institution has identified the consumers through consumer records comprising personal identity information and consumer financial activity, the method including:
   the advertising delivery provider receiving a targeted advertising campaign from an advertiser and generating a targeted ad for selected ones of the consumers in accordance therewith;
the advertising delivery provider receiving an approval of the targeted ad from the financial institution for possible communication to the selected ones;
   the advertising delivery provider receiving anonymous records from the financial institution, the anonymous records being identified by anonymous codings, the anonymous codings comprising a unique consumer identification code (UCIC) associated with each consumer and a financial institution identification code (FIIDC) that identifies the financial institution and the anonymous records further comprising the consumer records having been converted to the anonymous records by lacking the personal identity information and lacking a consumer preference for internet advertising, and segregated and associated with a plurality of anonymous codings corresponding to the consumers, respectively;
   the advertising delivery provider collating, via a processor, the anonymous records in response to the targeted advertising campaign including matching the anonymous records to the targeted advertising campaign and identifying the matches with corresponding ones of the plurality of anonymous codings;
   the advertising delivery provider creating identification codes that are unique to the consumers, assigning an identification code to each consumer, and associating the assigned identification code with one specific computing device via which the corresponding consumer is logged into the communication platform of the financial institution, wherein the identification code provides an anonymous identification of the consumer that is linked to the UCIC and the FIIDC;
   the advertising delivery provider creating a list of targeted corresponding anonymous codings associated with the anonymous records identified as matching the targeted advertising program, the list comprising a market segment selected for receipt of the ad;
   the advertising delivery provider receiving a signal from the financial institution indicative that a consumer corresponding to the market segment is on the communication platform of the financial institution;
   the advertising delivery provider communicating the ad to the financial institution in real time for display to the corresponding consumer as unsolicited internet advertising via the communication platform of the financial institution while the consumer is thereon, and wherein the ad is delivered to the consumer by displaying the targeted advertising program on the communication platform of the financial institution;
   the advertising delivery provider monitoring click activity while the ad is displayed to the consumer to determine if the displayed ad has been clicked by the consumer;
   upon determining that the ad has been clicked and the consumer redirected to a website corresponding to the ad or the targeted advertising program, recording the click activity for including in a report generated for the marketer, and if the ad has not been clicked, recording that the ad has not been clicked for including in the generated report.

20. The method of claim 19 wherein the receiving the anonymous records is without authorization of the consumer.

21. The method of claim 20 further including receiving a statement of no interest in receiving the ad for blocking any further communication of the ads to the consumer.

22. The method according to claim 19, wherein the communication platform of the financial institution is a website.

23. A method for selectively delivering consumer-unsolicited internet advertising by an advertising delivery provider to a set of consumers in a pre-existing association with a financial institution, including:
   receiving by the provider of consumer anonymous records from the financial institution, the anonymous records being identified by anonymous codings for forming an anonymous relationship between the consumer and the provider, the anonymous codings comprising a unique consumer identification code (UCIC) associated with each consumer and a financial institution identification code (FIIDC) that identifies the financial institution and the anonymous records further comprising consumer financial activity and lacking both consumer personal identity information and an indication of consumer preference for receipt of the internet advertising, and wherein the consumer anonymous records have been associated with a first anonymous coding per consumer respectively;
   segregating by the provider of the received consumer anonymous records with respect to predetermined consumer life-style indicators;
   collating by the provider via a processor of the anonymous records in response to a targeted advertising program received from a marketer including matching the lifestyle indicators to the targeted advertising program and identifying the matches with corresponding ones of the plurality of anonymous codings;
   the advertising delivery provider creating identification codes that are unique to the consumers, assigning an identification code to each consumer, and associating the assigned identification code with one specific computing device via which the corresponding consumer is logged into the communication platform of the financial institution, wherein the identification code provides an anonymous identification of the consumer that is linked to the UCIC and the FIIDC;

the advertising delivery provider creating a list of targeted corresponding anonymous codings associated with the anonymous records identified as matching the targeted advertising program, the list comprising a market segment selected for receipt of an ad comprising the advertising campaign;

receiving a signal from the financial institution to the provider indicative that a consumer corresponding to the market segment is on a communication platform of the financial institution;

communicating the ad to the financial institution from the provider for display as the unsolicited advertisement to the corresponding consumer via the communication platform of the financial institution in direct response to the financial institution signal without consumer authorization therefor, wherein the anonymous relationship is maintained during the communicating, and wherein the ad is delivered to the consumer by displaying the ad on the communication platform of the financial institution;

monitoring click activity while the ad is displayed to the consumer to determine if the displayed ad has been clicked by the consumer;

upon determining that the ad has been clicked and the consumer redirected to a website corresponding to the ad or the target advertising program, recording the click activity for including in a report generated for the marketer, and if the ad has not been clicked, recording that the ad has not been clicked for including in the generated report.

24. The method of claim 23 further including storing the determined anonymous codings of the market segment prior to receipt of the signal from the financial institution for ready delivery to the communication platform of the financial institution.

25. The method according to claim 16, further comprising the delivery provider detecting that the cookie is present on the consumer's computer, and upon said detection querying a database and identifying content for which the consumer qualifies based on the ADIC, and delivering said content to the consumer's computer.

26. The method according to claim 23, wherein the communication platform of the financial institution is a website.

* * * * *